(No Model.)
C. B. HOLDEN.
BALL TRAP.
No. 244,897.  Patented July 26, 1881.
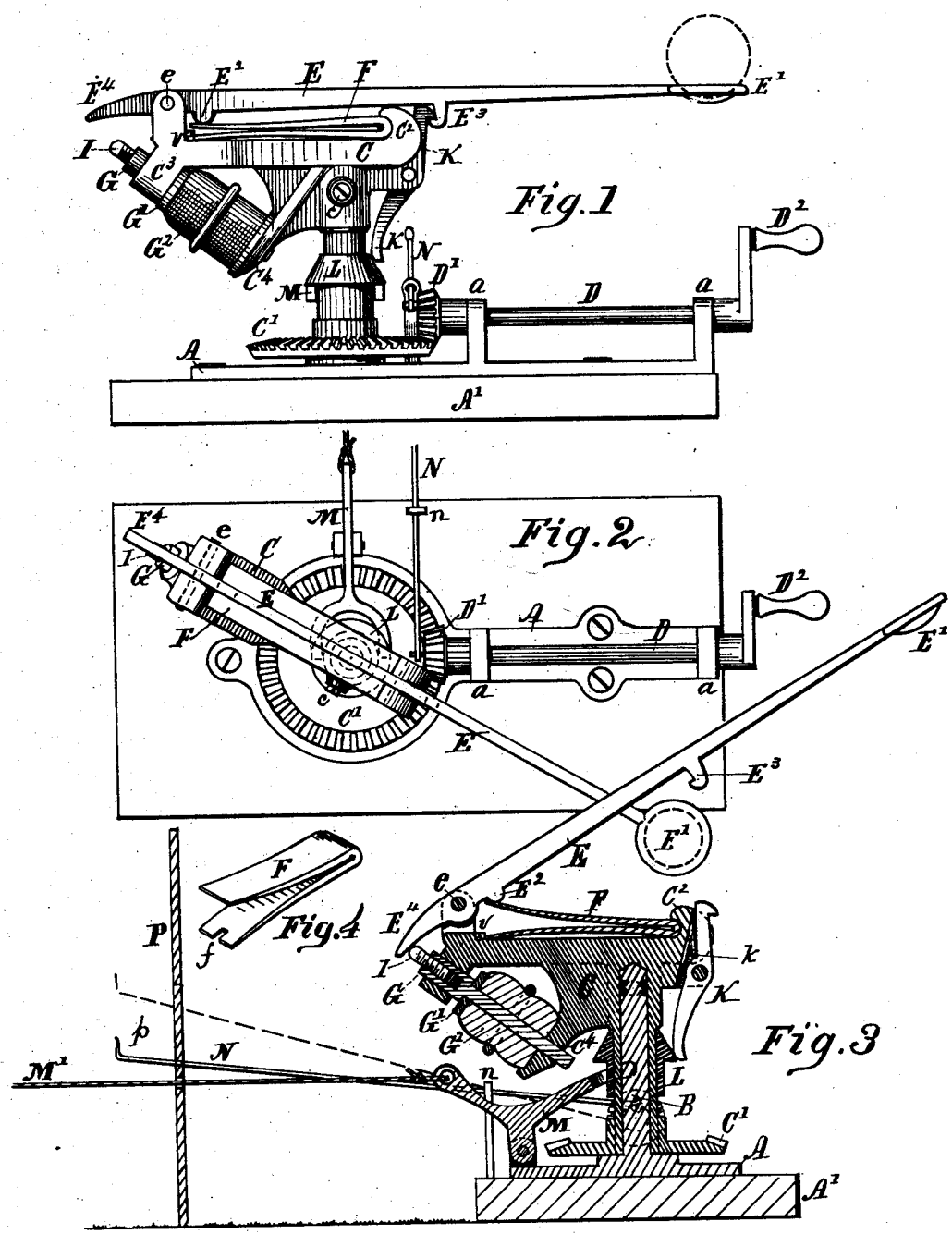
Witnesses
H. I. Lee
S. R. Barton
Inventor
Cyrus B. Holden
By Chas. H. Burleigh
Atty.

UNITED STATES PATENT OFFICE.

CYRUS B. HOLDEN, OF WORCESTER, MASSACHUSETTS.

BALL-TRAP

SPECIFICATION forming part of Letters Patent No. 244,897, dated July 26, 1881.

Application filed May 5, 1881. (No model.)

*To all whom it may concern:*

Be it known that I, CYRUS B. HOLDEN, of Worcester, in the county of Worcester and State of Massachusetts, have invented certain new and useful Improvements in Ball-Traps or Mechanism for Throwing Glass Balls; and I declare the following to be a description of my said invention, sufficiently, full, clear, and exact to enable others skilled in the art to which it appertains to make and use the same, reference being had to the accompanying drawings, which form a part of this specification.

The object of my present invention is to provide a convenient and serviceable mechanism for throwing target-balls for shooting-practice, which shall be quick and powerful in its action, simple in its operation, and not liable to become broken or disabled in use; also, to afford means for the convenient revolution of the trap, and to provide a suitable teller or device for indicating when the trap is in motion or at rest. I attain these objects by mechanism constructed and organized for operation substantially as illustrated and described, the partiular feattures of invention claimed being hereinafter definitely specified.

In the drawings, Figure 1 represents a rear view of my improved ball-trap. Fig. 2 is a plan view of the same. Fig. 3 is a vertical sectional view through the center of the standard, with the trap revolved one-fourth revolution from the position seen in Fig. 1; and Fig. 4 is a perspective view of the mainspring separate from the trap.

In the construction, A indicates the bed-frame for the support of the standard or pintle B, upon which the projecting mechanism is mounted and revolves. Said bed-frame may be secured to a plank or other suitable base-piece, A', as shown, or be provided with a pointed prong to be driven into the ground for retaining it in position for use, as desired.

C indicates the revoluble carrier or frame, constructed for properly supporting the action parts, and mounted on the pintle B, to which it is attached by means of the screw c, which enters a groove formed around the pintle to permit free rotative action.

C' denotes a beveled gear fixed to the carrier-standard and meshing with a pinion, D', on a horizontal shaft, D, arranged in bearings $a\ a$ on the bed-frame A, and provided with a crank, $D^2$, by means of which the attendant can conveniently rotate the trap as required.

E indicates the projector-lever, provided with a circle or cup, E', for holding the target-ball at one of its ends, and pivoted near the other, as at $e$, between suitable ears on the carrier C, in the manner illustrated, so that said lever can swing upward for throwing the balls. Said lever is provided with a spring bearing-lug, $E^2$, near the fulcrum-point $e$, and with a trigger-latch $E^3$, near its center.

F indicates the mainspring, which is made as a double-leaf or expanding-fork spring, (see Fig. 4,) and is arranged on the top of the carrier C and beneath the lever E in the position shown, where it is confined by the lip $C^2$, which curves over the folded end of the spring, and by the small lug or pin V, which enters a notch or recess, $f$, formed in the lower leaf of the spring, so that while said spring is retained in position it is permitted perfect freedom of action. The top leaf of the spring bears against the lug $E^2$ and throws the lever E upward by its expansive force. This spring is adapted for exerting great force with quickness of action, while it can undergo long-continued use without becoming set or fractured. The peculiar arrangement of the parts also permits of an easy action in setting the trap. The arrangement of this spring is an important feature of my invention.

G indicates the recoil buffer or cushion for receiving the shock of the projector-lever E. Said buffer is located beneath the lever-fulcrum $e$, and consists of a bar or pin arranged through bearings $C^3\ C^4$ on the carrier C, with its upper end in proper position to engage the short arm $E^4$ of the lever E as said lever is forced upward by the spring F. The bar G is provided with a shoulder and a washer, G', resting upon the end of the spring $G^2$, so as to compress said spring and relieve the strain and shock on the mechanism when the movement of the projector-lever is checked. An adjustable striker-pin, I, is fitted in the end of the bar G, by means of which the parts can be adjusted to give greater or less movement of the lever E, and the elevation or angle at which the balls are thrown thereby regulated.

K indicates the trigger or catch for holding and releasing the projector E. Said trigger is fulcrumed to the carrier C, as shown, with its upper end in position to engage the trigger-latch E³, and its lower end in position to be operated by the conical or beveled end of a slide or sleeve, L, arranged to move up and down on the standard, as illustrated. A small spring, $k$, may be arranged in connection with the trigger for forcing its upper end outward and locking it to the lever. E.

M indicates the discharging-lever, fulcrumed on the bed-frame A, and provided with a forked arm for raising the sleeve L, and with an operating-arm adapted for attachment to the pull-cord M′, which extends to the gunner's stand, and by means of which the trap is sprung.

N indicates a teller for showing the gunners when the trap is at rest or in motion. It consists of a rod working through a guide, $n$, and connected at its rear end to a crank-pin on the pinion D′. The forward part of the rod extends through a slot in the screen P, and moves up and down when the shaft D and trap are revolving; and a small bit of colored ribbon or other material on its end $p$ indicates to the gunner when the attendant has charged and started the trap, all other portions of the mechanism being concealed from his view by the screen P.

The trap is set for action, as indicated in Fig. 1. The attendant then turns the crank, causing the revolution of the throwing mechanism. The trap is then sprung from the gunner's stand by a pull on the cord M′, which actuates the lever M and forces the conical end of the sleeve L under the trigger K, thereby swinging it off the lug E³ and releasing the projector-lever E, and the latter, being forced upward, hurls the ball into the air with great force and swiftness in a direction corresponding to the position of the throwing mechanism at the instant of discharge.

What I claim as of my invention, and desire to secure by Letters Patent, is—

1. In a ball-trap, the combination, with the carrier-frame C, having bearings C³ C⁴ and projector-lever E, fulcrumed to said carrier at $e$, and provided with a projecting arm, E⁴, of the yielding buffer device, consisting of the bar G, with spring G² supported in said bearings on the carrier-frame beneath the lever-fulcrum, in position to engage the arm of said projector-lever, in the manner substantially as shown and described.

2. In a ball-trap, the combination, with the projector-lever and recoil-buffer arranged for action as described, of the adjustable striker-pin I, fitted to the end of the buffer-bar G for receiving the stroke of the lever-arm E⁴, as hereinbefore set forth.

3. In a ball-trap, the combination, with the revoluble carrier supporting the ball-throwing mechanism and trigger-lever located with its lower arm near the central standard, of a sliding sleeve, arranged to move up and down on said standard, and provided with a conical end or beveled surface for actuating said trigger-lever to release the throwing devices, substantially as set forth.

4. In a ball-trap, the combination of the projector-lever E, the trigger-lever K, fulcrumed at the side of the central supporting-standard, the sliding beveled sleeve L, movable up and down on said standard, the discharge-lever M, fulcrumed on the base-plate with its inner arm engaging with said sleeve, and cord M′, attached to said lever for actuating the parts, substantially as and for the purposes set forth.

5. The combination, with the revolving mechanism in a ball-trap, and the screen for concealing said trap, of a vibrating teller rod or signal actuated by the revolving mechanism, and visible from the front of said screen, for indicating when the trap is in motion or at rest, substantially as hereinbefore set forth.

6. The combination, substantially as described, of the bed-frame provided with the upright pintle, the carrier mounted and revoluble thereon, the projector-lever arranged on the top of said carrier and fulcrumed thereto, the mainspring supported on the top of said carrier and acting against the under side of said lever, near its fulcrum-point, the cushioning devices supported in bearings at the under part of the carrier for arresting the short arm of said lever, the trigger fulcrumed on the side of the carrier-standard and engaging a centrally-located catch-lug on said projector-lever, and the beveled sleeve movable on said standard for actuating said trigger, as hereinbefore set forth.

Witness my hand this 30th day of April, A. D. 1881.

CYRUS B. HOLDEN.

Witnesses:
CHAS. H. BURLEIGH,
H. J. LEE.